3,629,377
PROCESS FOR PREPARING PHOSPHATE ESTER SURFACE ACTIVE AGENTS IN THE PRESENCE OF A BIS(HYDROXYMETHYL) PHOSPHINIC ACID COLOR INHIBITOR
Leslie M. Schenck, Mountainside, and Leslie G. Nunn, Jr., Newark, N.J., assignors to GAF Corporation, New York, N.Y.
No Drawing. Continuation-in-part of application Ser. No. 543,544, Apr. 19, 1966. This application Feb. 20, 1969, Ser. No. 801,173
Int. Cl. C07f 9/08
U.S. Cl. 260—980
11 Claims

ABSTRACT OF THE DISCLOSURE

An improved process for producing phosphate ester surface active agents by the reaction of $P_2O_5$ and an organic hydroxyl-containing compound, the improvement relating to conducting such reaction in the presence of a color inhibitor comprising bis(hydroxymethyl) phosphinic acid.

---

This application is a continuation-in-part of our application Ser. No. 543,544 filed Apr. 19, 1966 and now abandoned.

The present invention relates to an improvement in the manufacture of phosphate esters and more particularly to a method of inhibiting the color formation of such materials.

It has long been known to produce alkylphosphate esters, alkylpolyglycol ether phosphate esters, aryl polyglycol ether phosphate esters and alkyl aryl polyglycol ether phosphate esters, etc., by reacting the appropriate hydroxyl-containing material with a number of different phosphating agents including phosphoric acid, $P_2O_5$, $PCl_3$, $POCl_3$, and the like. While such processes have, in some instances, produced surface active compounds or compositions which have been extremely useful for various purposes, these conventional processes suffer from the inherent disadvantage of the production of a colored product, i.e., a product having a VCS (Varnish Color Scale, Gardner Scale, Standard of 1933) of from 2 to 7. Thus, it has long been the desire of the industry to produce an efficient and inexpensive means for eliminating the color of such phosphate surface active agents. Various attempts at purifying the phosphate esters after production have not been successful in that such purification involves considerable expense in both equipment and materials. Therefore, the coloring of such phosphate surface active agents has not been successfully removed by such purification processes.

Recently, many manufacturers of products in which these phosphate esters are used have placed even more rigid color specifications upon the materials. Therefore, lightly colored products are more required in these applications where color in the finished formula or final product cannot be tolerated.

It has previously been found that the development of color in the phosphation of alcohols and nonionic surface-active agents can be inhibited by a small presence of hypophosphorus acid or its salts during phosphation. See, for example, U.S. Pat. 2,701,508 to Brown and Dearborn and U.S. Pat. 3,004,057 to Nunn. In accordance with the present invention, however, it has been discovered that such process can be improved to a substantial extent.

Thus, it has now been found that phosphate ester surface active agents can be produced which have extremely light color or are substantially colorless by the addition of small amounts of bis(hydroxymethyl) phosphinic acid to the hydroxyl compound prior to its reaction with the phosphating agent, phosphorus pentoxide, in the production of phosphate ester surface active agents.

It is therefore a principal object of the present invention to provide a process for the production of phosphate ester surface active agents which eliminates the problem of previous processes in the formation of colored materials.

It is yet a further object of the present invention to provide a process for the production of phosphate ester surface active agents in which a small amount of bis(hydroxymethyl) phosphinic acid is employed as a catalytic agent in the prevention of coloring of the finished product.

It is yet a further object of the present invention to provide such a process wherein the phosphinic acid material is added to the hydroxyl compound prior to the reaction with phosphorus pentoxide.

Still further objects and advantages of the process of the present invention will become more apparent from the following more detailed description of the invention.

By the process of the present invention, the coloring of phosphate ester surface active agents is substantially reduced by the incorporation of small amounts of bis(hydroxymethyl) phosphinic acid in the reaction of a suitable hydroxyl compound with phosphorus pentoxide. By such process, it is possible to produce phosphate ester surface active agents having a VCS color of less than about 1.

In the process of the present invention, phosphate esters are prepared by reacting, in the presence of a small amount of bis(hydroxymethyl) phosphinic acid, phosphorus pentoxide with hydroxyl containing organic compounds such as alcohols and glycol derivatives of the types normally employed in the production of commercial nonionic surfactants. The alcohols that can be utilized in accordance with the process of the present invention include those having alkyl and alkylene radicals in which the number of carbon atoms are from 1 to about 22. Suitable examples of such alcohols include methanol, ethanol, n-hexanol, dodecanol, docosanol, stearyl alcohol and oleyl alcohol, etc.

In addition to alcohols of the type mentioned above, the hydroxyl terminated products containing a glycol or polyglycol ether group can advantageously be phosphated by the process of the present invention. Such compounds are well known in the art and may be obtained by condensing an alcohol or other organic compound having an active hydrogen group with one or more molar proportions of an alkylene oxide, or with a glycol or polyglycol ether. A wide variety of such products are known in the art and a number of specific examples thereof are given in the above mentioned Nunn Pat. No. 3,004,057. Particularly valuable phosphate esters which can be obtained by the phosphation in accordance with the present invention are the type of glycol ethers available commercially as nonionic surface active agents.

Illustrative of products having a glycol or polyglycol ether group which may advantageously be phosphated by the process of the present invention are those having the formula $R(OA)_nOH$ in which R is an alkyl containing from 1 to 22 carbons, an aryl group or a group containing both alkyl and aryl radicals in which the sum of the carbon atoms in the alkyl substituents is from 1 to 36, $n$ is an integer of from 1 to 150, and A represents an alkylene group containing from 2 to 4 carbon atoms.

Also, the sulfur analogs of these hydroxyl-containing materials and other materials capable of forming surface active agents can be advantageously employed. Such materials include as representative examples, the alkylene oxide adducts of fatty acids, fatty amides, fatty amines, rosin amines, long-chain sulfonamides and long-chain mercaptans, etc.

In general, we particularly prefer the alkylene oxide adducts that are the condensation product of at least one mole of an alkylene oxide with one mole of a compound containing at least 6 carbon atoms and a reactive hydrogen atom.

The following list illustrates exemplary materials. In this list "E.O." means ethylene oxide and the number preceding same refers to the number of moles thereof reacted with one mole of the given reactive hydrogen-containing compound.

Nonylphenol+9–11 E.O.
Nonylphenol+2 E.O.
Dinonylphenol+7 E.O.
Dodecylphenol+18 E.O.
Castor oil+20 E.O.
Tall oil+18 E.O.
Oleyl alcohol+20 E.O.
Lauryl alcohol+4 E.O.
Lauryl alcohol+15 E.O.
Hexadecyl alcohol+12 E.O.
Hexadecyl alcohol+20 E.O.
Octadecyl alcohol+20 E.O.
Oxo tridecyl alcohol:
    (From tetrapropylene)+7 E.O.
    (From tetrapropylene)+10 E.O.
    (From tetrapropylene)+15 E.O.
Dodecyl mercaptan+9 E.O.
Soya bean oil amine+10 E.O.
Rosin amine+32 E.O.
Coconut fatty acid amine+7 E.O.
Cocoa fatty acid+10 E.O.
Dodecylbenzene sulfonamide+10 E.O.
Decyl sulfonamide+6 E.O.
Oleic acid+5 E.O.
Polypropylene glycol (30 oxypropylene units)+10 E.O.

Included also within the applicable glycol derivatives are those materials which are defined as block polymer surfactants of the Pluronic type which may be represented by the following formula:

where A and A' are different and each contains from 2 to 4 carbon atoms, and $a$ and $b$ represent a number from 1 to 150. A suitable example of such materials is that known as pluronic L-62, a material of the formula $HO(C_2H_4O)_5(C_3H_6O)_{30}(C_2H_4O)_5$. These various glycol derivatives may be produced by the process described at Page 512 in the Encyclopedia of Chemical Technology, Second Supplement, September, 1960.

The phosphate esters of the above-described hydroxylic compounds are generally prepared by adding 1 to 3 moles of $P_2O_5$ to 1 to 4 moles of the appropriate hydroxylic compound at a temperature ranging from ambient temperature to 130° C. while holding the reaction mixture at 100° to 135° C. for ½ to 5 hours. By such a reaction without the use of the color inhibitor of the present invention, the VCS colors of the produced materials range from approximately 2 to about 7.

By the practice of the present invention, however, wherein bis(hydroxymethyl) phosphinic acid is added to the hydroxyl compound prior to its reaction with $P_2O_5$ under the generally employed conditions described above, VCS colors of 2 or less, and indeed less than 1 in many cases, are obtained. In all cases, the VCS color is at least one unit less than that obtained when the inhibitor is not employed.

The inhibitor, bis(hydroxymethyl) phosphinic acid, as stated previously, is usually employed in a small amount in the reaction mixture. Generally, only sufficient phosphinic acid material need be employed that will affect the coloring of the material that is produced to the extent that the VCS color is reduced at least one unit to a value of 2 or less and, in many cases, below 1. In general, from about 0.01 to about 6% and preferably 0.1 to about 3% of this compound is employed, based on the weight of the surface active agent produced.

The inhibitor, bis(hydroxymethyl) phosphinic acid is an odorless, colorless compound and does not produce any odor or color when it is added to the hydroxylic compound or during the course of the reaction. It forms colorless and odorless by-products which are not objectionable in the final product and which can be removed if necessary, easily. Also, it is not necessary to remove or destroy any of the unreacted phosphinic acid component after the reaction is complete as its presence in the final surface active product is not objectionable in any way. In carrying out the phosphation reaction, in accordance with the present invention, the $P_2O_5$ is preferably added gradually with vigorous agitation to the hydroxyl-containing material to which has been added a small amount of the inhibitor bis(hydroxylmethyl) phosphinic acid. Alternatively, if desired, the inhibitor may be added simultaneously with the addition of the $P_2O_5$, or may be admixed with the $P_2O_5$ prior to its addition to the hydroxylated compound. The addition of the inhibitor to the hydroxylated compound prior to addition to $P_2O_5$ is preferred, however This reaction is conventionally conducted at a temperature ranging from ambient temperature to 130° C. The reaction proceeds continuously during addition of the $P_2O_5$ and is substantially 90% complete or more by the time all of the $P_2O_5$ has been added. The few particles of solid $P_2O_5$ remaining in the reaction medium may be removed at this point if time is of the essence; but it is preferred, in the interest of economy, to allow the reaction to proceed an additional period of time which may range from ½ hour to 5 hours or more at temperatures ranging from 100° to 135° C. until all of the $P_2O_5$ has dissolved, indicating complete reaction between the reactants involved. Vigorous agitation during the reaction is highly desirable to facilitate and expedite completion of the reaction.

It is an advantageous feature of this invention that the $P_2O_5$ may be employed in dry solid form as a granular powder or other finely divided or particulate form for reaction with the above-defined hydroxylated materials. However, if desired, the $P_2O_5$ may first be dispersed in an inert organic diluent such as benzene, xylene, ether, pentane or low and high boiling hydrocarbon fractions.

It is pointed out that the process of the present invention, as can be seen from the above, is not predicated upon the embodiment of any particular type of hydroxyl-containing compound, and in fact, the process of the present invention can be suitably employed in connection with any and all hydroxyl-containing compounds which can be phosphated by reaction with $P_2O_5$ to produce a phosphate ester surface active agent. In this regard, the process of the present invention can be considered an improvement in a general environment, the improvement relating to the inhibition of colors in the production of a phosphate ester surface active agent by the addition of an effective amount, i.e., a color inhibiting amount, of bis(hydroxylmethyl) phosphinic acid.

The following examples illustrate various embodiments of the present invention. In all of the examples, a first control run was conducted with the particular hydroxylated material set forth in the example and $P_2O_5$ in the absence of the phosphinic acid additive of the present invention. In all cases, the reaction was conducted at a temperature ranging from ambient temperature to about 130° C., with subsequent holding of the reaction mixture at 100° C. to 135° C. for approximately one-half to 5 hours.

A similar run was made for each hydroxylated material under identical conditions with the employment of the inhibitor of the present invention. The VCS color for both runs was measured in the prescribed manner, a reading of 1 being the lowest color reading measurable by this method with the highest being 18.

It will be understood that all parts and proportions referred to herein and in the appended claims are by weight unless otherwise indicated.

EXAMPLES 1-29

| Chemical Name | Mole wt. | Parts | Parts of $P_2O_5$ | Hydroxylic compound to $P_2O_5$ | Bis(hydroxymethyl) phosphinic acid | VCS color | VCS color of control |
|---|---|---|---|---|---|---|---|
| Methanol | 32 | 192 | 284 | 3:1 | 1.2 | 1 | 3 |
| Ethanol | 46 | 138 | 142 | 3:1 | 2.4 | 1 | 4 |
| i-Propanol | 60 | 240 | 142 | 4:1 | 2.4 | 1 | 3 |
| n-Butanol | 74 | 296 | 142 | 4:1 | 2.4 | 1 | 2 |
| n-Hexanol | 100 | 300 | 142 | 3:1 | 1.2 | 1 | 4 |
| Dodecanol | 186 | 558 | 142 | 3:1 | 2.4 | 1 | 5 |
| Steary alcohol | 270 | 1,080 | 142 | 4:1 | 5.0 | 1 | 4 |
| Oleyl alcohol | 268 | 1,072 | 142 | 4:1 | 10.0 | 1 | 6 |
| Docosanol | 326 | 978 | 142 | 3:1 | 0.1 | 1 | 3 |
| Nonylphenol+1 E.O.[1] | 264 | 660 | 142 | 2.5:1 | 2.4 | 1 | 3 |
| Nonylphenol+6 E.O | 484 | 484 | 47.3 | 3:1 | 0.6 | <1 | 1+ |
| Nonylphenol+6 E.O | 484 | 484 | 47.3 | 3:1 | 2.4 | <1 | 1+ |
| Nonylphenol+10 E.O | 440 | 880 | 142 | 2:1 | 2.4 | 1 | 4 |
| Nonylphenol+150 E.O | 6,600 | 660 | 426 | 1:3 | 6.6 | 1 | 2 |
| Methanol+1 Pr.O[2] | 90 | 243 | 142 | 2.7:1 | 1.2 | 1 | 2 |
| Ethanol+2 Bu.O | 190 | 475 | 142 | 2.5:1 | 2.4 | 1 | 3 |
| Lauryl alcohol+4 E.O | 362 | 905 | 142 | 2.5:1 | 6.6 | 1 | 5 |
| Dodecylphenol+18 E.O | 1,054 | 316.2 | 14.2 | 3:1 | 1.5 | 1 | 2 |
| Dinonylphenol+7 E.O | 654 | 392 | 28.4 | 3:1 | 1.2 | 1 | 7 |
| Phenol+6 E.O | 358 | 1,074 | 142 | 3:1 | 22.0 | 1 | 3 |
| "Pluronic L-62" | 2,198 | 879 | 14.2 | 4:1 | 2.4 | 1 | 2 |
| Oleic acid+5 E.O | 502 | 1,004 | 72.1 | 4:1 | 1.0 | 2 | 4 |
| Tridecylalcohol+40 Bu.O.[3] | 3,080 | 924 | 14.2 | 3:1 | 5.0 | 2 | 7 |
| Tridecylphenol+20 Pr.O.[2] | 1,758 | 703 | 14.2 | 4:1 | 2.4 | 2 | 4 |
| Cresol+10 Pr.O | 688 | 206 | 72.1 | 3:1 | 0.6 | 2 | 3 |
| Dodecylmercaptan+6 E.O | 466 | 932 | 72.1 | 4:1 | 5.0 | 2 | 4 |
| Octylphenol+100 E.O | 4,606 | 461 | 28.4 | 1:2 | 2.4 | 1 | 3 |
| Hexylphenol+50 E.O | 2,399 | 240 | 14.2 | 1:1 | 2.4 | 1 | 2 |
| Nonylphenol 100 E.O | 4,620 | 924 | 14.2 | 2:1 | 46.2 | 1 | 2 |

[1] E.O.—ethylene oxide.
[2] P.O.—propylene oxide.
[3] B.O.—butylene oxide.

As can be seen by the comparison of the VCS colors of the control and the reaction wherein the phosphinic acid inhibitor of the present invention was employed, the inhibitor of the present invention in all cases lowered the color value at least one unit and, indeed, in most cases, lowered the color value to 1, the lowest value measurable by the VCS method. Furthermore, the products prepared by the use of the additives of the present invention were found to sustain no change in color after even 3 to 6 months' storage.

We claim:
1. In a process comprising reacting $P_2O_5$ with an organic hydroxyl-containing compound to form a phosphate ester surface active agent, the improvement which comprises conducting the reaction in the presence of a color inhibiting amount of bis(hydroxymethyl) phosphinic acid.
2. The process of claim 1 wherein the bis(hydroxymethyl) phosphinic acid is added to the organic hydroxyl-containing compound prior to addition of $P_2O_5$.
3. The process of claim 1 wherein the organic hydroxyl-containing compound is selected from
   (a) alkyl and alkylene alcohols having from 1–22 carbon atoms.
   (b) alkylene oxide derivatives of organic active hydrogen-containing compounds having the formula $R(OA)_nOH$ wherein R is an alkyl radical containing 1–22 carbon atoms, an aryl group or a group containing both aryl and alkyl radicals in which the sum of the carbon atoms in the alkyl substituent is from 1–36, $n$ is an integer from 1–150 and A represents an alkylene group containing from 2 to 4 carbon atoms.
   (c) alkylene oxide derivatives of active hydrogen-containing compounds selected from fatty acids, fatty amines, fatty amides, rosin amines, long-chain sulfonamides and long-chain mercaptans, and
   (d) block polymers of the formula $H(OA)_a(OA')_bOH$ wherein A and A' are different alkylene radicals containing from 2 to 4 carbon atoms and $a$ and $b$ are each integers from 1 to 150.
4. The process of claim 1 wherein said organic hydroxyl-containing compound is a nonionic compound.
5. The process of claim 4 wherein the bis(hydroxylmethyl) phosphinic acid is added to said nonionic compound prior to addition of $P_2O_5$.
6. The process of claim 4 wherein said nonionic compound is an alkylene oxide derivative as defined in paragraph (b) of claim 3 above.
7. The process of claim 6 wherein said alkylene oxide is ethylene oxide.
8. The process of claim 4 wherein said nonionic compound is the reaction product of 1 mole of a $C_{1-22}$ alkanol with 1 to 36 moles of a $C_{2-4}$ alkylene oxide.
9. The process of claim 8 wherein said alkylene oxide is ethylene oxide.
10. The process of claim 9 wherein said alkanol is lauryl alcohol.
11. The process of claim 3 wherein said alkylene oxide is ethylene oxide.

References Cited
UNITED STATES PATENTS

| 2,701,258 | 1/1955 | Brown et al. | 260—980 |
| 3,004,056 | 10/1961 | Nunn et al. | 260—980 X |
| 3,318,982 | 5/1967 | Klose et al. | 260—980 |
| 3,331,896 | 7/1967 | Eiseman et al. | 260—980 |

CHARLES B. PARKER, Primary Examiner
R. L. RAYMOND, Assistant Examiner

U.S. Cl. X.R.
260—403, 989